United States Patent Office 3,531,271
Patented Sept. 29, 1970

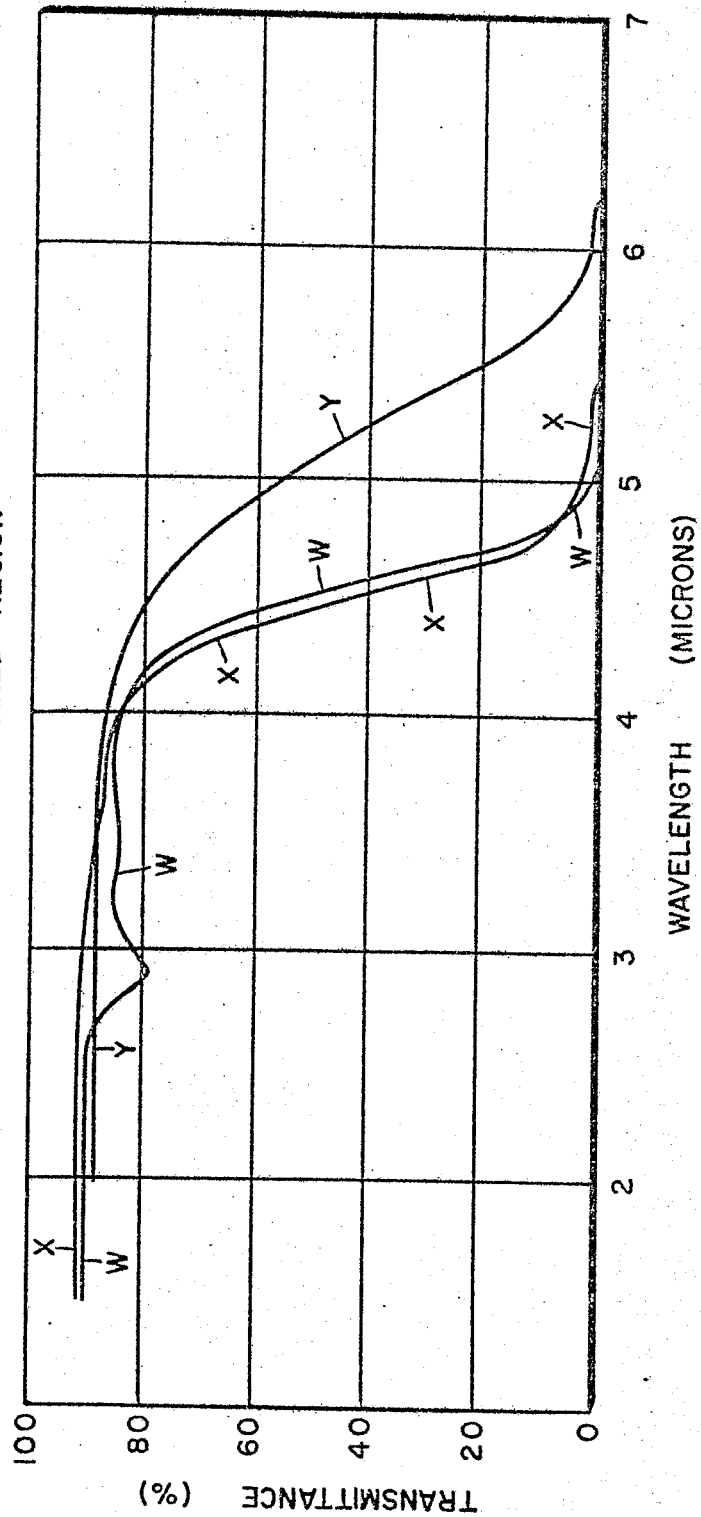

3,531,271
METHOD OF DRYING GLASSES BY
AN ANHYDROUS AGENT
William H. Dumbaugh, Jr., Corning, N.Y., assignor to
Corning Glass Works, Corning, N.Y., a corporation of
New York
Continuation-in-part of application Ser. No. 605,677,
Dec. 29, 1966. This application Nov. 13, 1967, Ser.
No. 682,332
Int. Cl. C03b 5/16
U.S. Cl. 65—32        10 Claims

ABSTRACT OF THE DISCLOSURE

A method of making glasses having a very low water content and particularly a method of making improved infrared transmitting glasses by substantially removing the water absorption band in the region of about 2.9 microns.

---

This application is a continuation-in-part of my copending application Ser. No. 605,677 filed on Dec. 29, 1966.

Glasses which have good infrared transmitting properties are being widely used in various industries, for example, for infrared illumination and signaling. These glasses also have specific military uses in guidance systems.

It has been reported by E. B. Shand in "Glass Engineering Handbook," McGraw-Hill (1958), 62, that absorption in the infrared region for silicate glasses becomes practically complete at wave lengths between 4 and 5 microns. As an illustration, the author shows the transmittance curve of a 96% silica glass having a transmittance of approximately 40% at a wave length of 3.5 microns and 30% at a wave length of 4 microns. While this glass may be useful for some purposes, it does not meet the requirements for certain military applications wherein the glass should have an infrared transmittance of at least 80% at a wave length of 3.5 microns and at least 70% transmittance at a wave length of 4.0 microns for a 2 millimeter thickness of glass.

In another copending application, Ser. No. 439,207, filed on Mar. 12, 1965 now abandoned. I have described particular silicate glasses based upon the calcium oxide-aluminum oxide-silica system, which have the above infrared transmission requirement. Such glasses, in addition, have a coefficient of expansion sufficiently low to prevent breakage as a result of thermal shock. These glasses unfortunately have an undesirable infrared absorption band, in the region of 2.75–2.95 micron wave length, due to the presence of water in the glasses.

Particularly, residual water causes a strong absorption of infrared at a wave length of about 2.9 microns, resulting in a sharp break in the transmittance curve. Absorption, or conversely transmittance, at a wave length of 2.6 microns is relatively insensitive to the low concentrations involved in residual water. Residual water content may therefore be specified in terms of an absorption coefficient, hereafter called "beta value" and designated "$B_{OH}$," which is calculated from the formula:

$$B_{OH} = \frac{1}{t} \log_{10} \frac{T_{2.6}}{T_{2.9}}$$

wherein $t$ = glass thickness in mm.
$T_{2.6}$ = transmittance in percent at 2.6 microns
$T_{2.9}$ = transmittance in percent at 2.9 microns and
$B_{OH}$ is in terms of mm.$^{-1}$.

It is therefore an object of the present invention to provide a method of making glasses having very low water content.

It is a further object of the present invention to provide a method of substantially removing the water absorption band from infrared transmitting glasses.

In accordance with the present invention, I have discovered an improved method of making a low water content glass body by mixing the batch ingredients together with an effective amount of a chemically-reactive, chlorine containing agent and melting the glass at the fusion temperatures in the presence of a dry atmosphere flowing directly over the glass melt. A preferred calcium aluminogermanate glass prepared by my method when formed into a body having a thickness of about 2 millimeters, has a maximum $B_{OH}$ value of 0.020 mm.$^{-1}$ and a transmittance of at least 80% at a wave length of 4.25 microns, 50% at a wave length of 5.0 microns, and 15% at a wave length of 5.5 microns.

Residual water can be removed from numerous glass compositions using the procedures described herein. Excellent results are obtained with aluminosilicate and aluminogermanate glasses. The process is also quite effective in removing residual water from soda lime glass, borosilicate glass, lead glass, and non-silicate glasses such as germanate glasses and tellurite glasses. However, the procedure cannot be used to remove water from fused silica or from 96% silica glasses in which the addition of a chemically-reactive, chlorine containing agent is undesirable. The effectiveness of the chlorine drying technique is to some extent reduced by the presence of certain constituents in the glass batch which are capable of reacting with a chloride and thereby forming volatile reaction products. Thus, an interfering reaction may arise by the presence of, for example, large amounts of alkali, lead, and iron compounds which compete for the chlorides and make the process less effective. When these elements are present it is recommended to compensate therefor by the addition of an excess of the cations lost through volatilization.

In order to form the novel glass of this invention proper selection of batch materials is required. Thus hydrated materials such as alumina hydrate and calcium hydroxide must be avoided since these have a large effect on the water content of the glass. The type of raw material, e.g. sand, germania and calcined alumina can also affect water content, but to a much lesser extent than the hydrated materials.

The accompanying drawing illustrates the improvement in the infrared transmittance of glasses prepared according to the method of the present invention.

Referring to the drawing the transmittance of glasses 2.0 mm. thick in the infrared region is shown as follows:

Curve W represents the percent transmittance of an untreated silicate glass composition prepared in Example I hereinbelow. It is noted that there is an OH group absorption band in the region of about 2.9 microns.

Curve X represents the percent transmittance of a treated silicate glass composition prepared in accordance with Example II hereinbelow. It is noted that the OH group absorption band in the region of 2.9 microns has been completely removed.

Curve Y represents the percent transmittance of a treated germanate glass composition prepared as in Example V hereinbelow. This glass also shows a substantial absence of an OH group absorption band in the region of 2.9 microns and in addition, when compared to the silicate glass of curve X, it has a substantially greater transmittance in the infrared region.

In removing residual water from glasses by my novel process, the batch ingredients initially must be mixed together with a chemically reactive, chlorine containing agent. As used herein this agent is a compound which is capable of reacting during melting to replace the OH groups present in the glass network. The chlorine containing agent must be substantially anhydrous and normally a solid which is generally stable at temperatures up to 100° C. The reaction may be illustrated as follows:

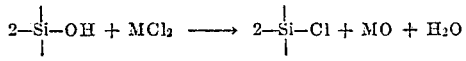

A highly effective agent is anhydrous calcium chloride which is typically mixed in powder form with the glass batch. An amount of chlorine at least equivalent to about three mole percent $CaCl_2$ is recommended to substantially remove the OH group as described hereinabove. Typically no more than an amount of chlorine equivalent to seven mole percent of $CaCl_2$ is useful and while greater amounts even up to ten mole percent may be mixed with the batch, no increase in effectiveness is normally obtained. Since it is very hygroscopic, it is important that the calcium chloride or the batch containing it not be exposed to moisture for any length of time. The preferred agents which can be used are the chlorides of the alkaline earth metals, zinc, cadmium, lead and aluminum. Thus, for example any of the other alkaline earth chlorides can be substituted for an equal amount of calcium oxide in the base composition without detrimentally affecting the required properties of the product.

Possible chlorine containing agents which generally meet the requirements include the following:

| | |
|---|---|
| LiCl | $SnCl_2$ |
| NaCl | $TeCl_2$ |
| KCl | $AlCl_3$ |
| RbCl | $ScCl_3$ |
| CsCl | $TiCl_3$ |
| TlCl | $YCl_3$ |
| AgCl | $LaCl_3$ |
| InCl | $AuCl_3$ |
| AuCl | $BiCl_3$ |
| $BeCl_2$ | $GaCl_3$ |
| $MgCl_2$ | $ZrCl_3$ |
| $CaCl_2$ | $SbCl_3$ |
| $SrCl_2$ | $InCl_3$ |
| $BaCl_2$ | $SeCl_4$ |
| $ZnCl_2$ | $ZrCl_4$ |
| $CdCl_2$ | $TeCl_4$ |
| $PbCl_2$ | $HfCl_4$ |
| $Hg_2Cl_2$ | $NbCl_5$ |
| $HgCl_2$ | $MoCl_5$ |
| $GaCl_2$ | $TaCl_5$ |
| $ZrCl_2$ | $WCl_5$ |
| $InCl_2$ | $WCl_6$ |

However, many of the above chlorine containing compounds, while theoretically possible, are in fact somewhat impractical because the particular compound is undesirable in or may detrimentally affect the base glass and the compound may be too scarce and expensive as an additive for this purpose.

During the melting of the batch at the fusion temperature of about 1500°–1650° C., it is necessary that a dry atmosphere flow directly over the glass melt. This is essential to remove any of the water formed by the reaction with the chlorine containing agent from the reaction zone and to prevent any other moisture from reaching the surface. By flowing the dry gas directly over the glass melt, a low water vapor pressure is maintained and the water is removed rapidly to displace the reaction equilibrium in favor of substantial complete substitution of chlorine for the OH group. Dry atmospheres useful herein include dry or dried gases, such as air, nitrogen, helium, argon, oxygen, carbon dioxide and sulfur dioxide. While the rate of flow of the dry atmosphere depends on many factors, such as size and surface area of the vessel or furnace in which the glass is being fused, there should be a sufficient flow to adequately remove the water vapor which has formed.

The fused glass may then be subjected to conventional glass forming techniques. It can be cast into a desired shape, conventionally annealed, and subjected to grinding and polishing.

While the method described herein has been discussed primarily for improvement in infrared transmission, it is also highly advantageous for various other glass applications where only a minimum of water can be tolerated. An area of particular interest is in the lighting field and specifically in making envelopes used for high temperature vapor lamps.

My invention is further illustrated by the following examples.

EXAMPLE I

A glass composition was prepared and melted from the following formulation:

| Oxide | Weight percent | Mole percent | Batch materials | Weight, grams |
|---|---|---|---|---|
| $SiO_2$ | 31.8 | 36.91 | Kona acid washed sand | 159.0 |
| $Al_2O_3$ | 39.2 | 26.80 | Alcoa T-61 calcined alumina | 196.0 |
| CaO | 29.2 | 36.29 | Calcium carbonate | 281.6 |

The batch materials were weighed and mixed by ball milling for four hours. Then the batch was melted in a platinum crucible in a platinum-20 rhodium wound resistance furnace at a temperature of 1550° C. for a period of four hours. Thereafter the molten glass was poured into plates in an iron mold and annealed at a temperature of 832° C.

The infrared properties of the glass are shown in the drawing and have been designated as curve W. It is noted that there is an OH group absorption in the region of about 2.9 microns. A piece of the glass product 2 mm. in thickness exhibited a $B_{OH}$ value of 0.05 mm.$^{-1}$.

EXAMPLE II

An infrared transmitting glass composition was prepared and melted from the following formulation:

| Constituent | Weight percent | Mole percent | Batch materials | Weight, grams |
|---|---|---|---|---|
| $SiO_2$ | 30.55 | 36.91 | Berkeley fine dry sand | 91.84 |
| $Al_2O_3$ | 37.64 | 26.80 | Alcoa T-61 calcined alumina | 113.26 |
| CaO | 24.17 | 31.29 | Calcium carbonate | 129.95 |
| $CaCl_2$ | 7.64 | 5.00 | Calcium chloride | 22.92 |

The batch materials were weighed and mixed by ball milling for four hours.

The substantially homogeneously mixed batch containing the chemically-reactive, chlorine containing agent was then transferred into a platinum crucible, placed in a platinum-rhodium wound tube furnace, and heated at a temperature of 1550° C. As the batch was being melted, dry nitrogen gas was continuously flowing directly over the surface of the melt at a rate of 100 cc./min. After four hours, the nitrogen flow tube was removed, the melt was immediately poured into an iron mold and then the glass was annealed by slowly cooling from 832° C.

The infrared properties of the glass are shown in the drawing and have been designated as curve X. A comparison between curve X and curve W indicated that the method of the present invention almost completely removes the OH group absorption band in the region of 2.9 microns. The difference of absorption is calculated as follows:

| | Drying agent | $B_{OH}$ |
|---|---|---|
| Glass: | | |
| Ex. I | None | 0.05 |
| Ex. II | $CaCl_2$ | <0.01 |

The other properties of glass of Example II are substantially identical to those of Example I.

EXAMPLE III

An infrared transmitting glass body was made following the procedure and using the formulation of Example II, with the exception that five mole percent of aluminum chloride was substituted as the chemically-reactive, chlorine containing agent. A piece of the glass product 2 mm. in thickness exhibited a $B_{OH}$ value of 0.01 mm.$^{-1}$. Thus aluminum chloride is just about as effective as for this purpose as calcium chloride.

EXAMPLE IV

Following the procedure and using the formulation of Example II, experiments were conducted to determine the effect of various gases and the effect of the location of the gas flow upon the water content of the glass. The data and the results are set forth in the table below.

| | Flow position | Flow rate, cc./min. | $B_{OH}$ value |
|---|---|---|---|
| Gas: | | | |
| $N_2$ | Directly over surface | 100 | <0.01 |
| $N_2$ | do | 50 | 0.02 |
| $N_2$ | Side of crucible | 50 | 0.04 |
| He | Directly over surface | 100 | 0.02 |
| $O_2$ | do | 100 | 0.01 |
| Air (dry) | do | 100 | <0.01 |
| Air (wet) | Furnace atmosphere | None | 0.05 |

These results show that when the dry gas was flowing directly over the surface of the melt, the $B_{OH}$ value was not greater than 0.02; however when the dry gas was flowing along the side of the crucible or when melting was performed in the presence of a wet gas, the $B_{OH}$ value was substantially greater. Thus it may be concluded that it is essential that the dry gas flow directly over the surface of the melt to efficiently remove escaping water and prevent any other water from reaching the surface.

EXAMPLE V

A preferred infrared transmitting germinate glass was prepared and melted from the following formulation:

| Oxide | Weight percent | Mole percent | Batch materials | Weight, grams |
|---|---|---|---|---|
| $GeO_2$ | 44.7 | 36.9 | Germanium dioxide | 650.4 |
| $Al_2O_3$ | 31.7 | 26.8 | Calcined alumina | 460.5 |
| CaO | 23.6 | 36.3 | Calcium carbonate | 529.8 |
| | | | Calcium chloride | 93.5 |

The batch was then placed in a platinum crucible and melted at 1500° C. for 4 hours with dry nitrogen flowing over the surface at about 100 cc./min. It was then cast into a slab or pressed into a dome shape and annealed at 760° C.

The infrared properties of the glass are shown in the FIG. 2 and have been designated as curve Y. A piece of the glass product 2 mm. in thickness exhibited a $B_{OH}$ value of less than 0.01 mm.$^{-1}$.

EXAMPLES VI-XI

In order to further show the effectiveness of the process of the present invention, various other glass compositions treated to remove the water were prepared essentially according to the procedure of Example II, and these were then compared in water content to glasses having the same composition which remained untreated as prepared essentially according to Example I. The glass compositions in weight percent as calculated from the batch on the oxide basis is set forth in the table below.

TABLE

| | Ex. VI | Ex. VII | Ex. VIII | Ex. IX | Ex. X | Ex. XI |
|---|---|---|---|---|---|---|
| $SiO_2$ | 73.0 | 58.0 | 56.9 | | | 63.3 |
| $B_2O_3$ | 16.5 | 4.0 | 5.96 | | | |
| $Al_2O_3$ | | 15.0 | 14.91 | | 55 | 4.5 |
| $Na_2O$ | 4.25 | | | | | 7.7 |
| $K_2O$ | | | | 10 | | 10.3 |
| MgO | | 6.9 | 2.98 | | 5 | 2.4 |
| CaO | | 10.0 | 11.13 | | 30 | 3.5 |
| BaO | | 6.0 | 7.55 | 16 | | 6.8 |
| PbO | 6.25 | | | | | |
| $ZrO_2$ | | | | 10 | | |
| $TeO_2$ | | | | 84 | | |
| $CeO_2$ | | | | | | 0.5 |
| $As_2O_3$ | | 0.5 | 0.50 | | | 0.4 |
| F | | | | | | 1.3 |

The chemically-reactive, chlorine containing agent included in the formulations given above for each of the glass compositions and the amount thereof used in weight percent is shown in the table below. A comparison in the water content, as determined by $B_{OH}$ values, between the treated glass and the untreated glass clearly indicates that my process is very effective as a drying procedure.

| | | | $B_{OH}$ | |
|---|---|---|---|---|
| | Drying agent | Wt. percent | Without chloride drying | With chloride drying |
| Glass: | | | | |
| Ex. VI | $PbCl_2$ | 3 | 0.380 | 0.043 |
| Ex. VII | $CaCl_2$ | 8 | 0.095 | 0.008 |
| Ex. VIII | $CaCl_2$ | 5 | 0.216 | 0.083 |
| Ex. IX | $BaCl_2$ | 20.5 | 0.142 | 0.095 |
| Ex. X | $CaCl_2$ | 5 | 0.115 | 0.086 |
| Ex. XI | $BaCl_2$ | 4.5 | 0.057 | 0.032 |

I claim:
1. A method of making glass having a low water content in the glass network comprising the steps of:
   (a) mixing glass batch ingredients including an effective amount of a solid chemically reactive residual - water - content - removing - chlorine - containing agent, and
   (b) melting the batch at the glass fusion temperatures in the presence of a dry atmosphere flowing directly over the glass melt.
2. The method of claim 1, wherein said agent is substantially anhydrous and normally a solid which is stable at temperatures of up to 100° C.
3. The method of claim 2, wherein said chlorine containing agent is a member selected from the group consisting of the chlorides of alkaline earth metals, zinc, cadmium, lead and aluminum.
4. The method of claim 2, wherein the amount of said chlorine containing agent is equivalent to 3–7 mole percent of calcium chloride.
5. The method of claim 1, wherein said dry atmosphere is a member selected from the group consisting of dry air, nitrogen, helium, argon, oxygen, carbon dioxide and sulfur dioxide.
6. The method of claim 5, wherein said chlorine containing agent is anhydrous calcium chloride and said dry atmosphere is nitrogen.
7. The method of claim 1, wherein the batch materials are substantially anhydrous.
8. A method of making a glass body having a maximum $B_{OH}$ value of 0.02 mm.$^{-1}$ comprising the steps of:
   (a) mixing the glass batch ingredients including an effective amount of a solid chemically reactive residual - water - content - removing - chlorine - containing agent,
   (b) melting the batch at the glass fusion temperatures in the presence of a dry atmosphere flowing directly over the glass melt, and
   (c) forming the glass melt into a body.
9. The method of claim 8, wherein the body is formed from an aluminosilicate glass and the agent is an anhydrous alkaline earth metal chloride.

10. The method of claim 8, wherein the body is formed from an aluminogermanate glass and the agent is an anhydrous alkaline earth metal chloride.

References Cited

UNITED STATES PATENTS

| | | | |
|---|---|---|---|
| 2,612,726 | 10/1952 | Nordberg | 65—32 |
| 2,982,053 | 5/1961 | Elmer | 65—32 XR |
| 3,113,008 | 12/1963 | Elmer | 65—32 XR |
| 3,220,814 | 11/1965 | Haven et al. | 65—32 |
| 3,228,760 | 1/1966 | Cullercoats et al. | 65—32 |
| 3,338,694 | 8/1967 | Davy | 65—32 |

FRANK W. MIGA, Primary Examiner

U.S. Cl. X.R.

65—27, 134; 106—52